United States Patent
Steingroever

[15] 3,699,487
[45] Oct. 17, 1972

[54] MAGNET FOR USE IN MAGNETIC THICKNESS GAUGES

[72] Inventor: Erich Steingroever, Bonn, Germany

[73] Assignees: Elektro-Physik Hans Nix; Dr. Ing. Steingroever, K.G., Koln, Germany

[22] Filed: April 13, 1971

[21] Appl. No.: 133,600

[30] Foreign Application Priority Data

Nov. 7, 1970   Germany..........P 20 54 929.5

[52] U.S. Cl..............................335/302, 324/34 TK
[51] Int. Cl...............................................H01f 7/02
[58] Field of Search ..........335/302, 304; 324/34 TK

[56] References Cited

UNITED STATES PATENTS

| 2,749,505 | 6/1956 | McNary.................324/34 TK |
| 3,359,152 | 12/1967 | Blume.....................335/302 X |
| 3,540,945 | 11/1970 | Strnat et al..........335/302 UX |
| 3,558,372 | 1/1971 | Becker................335/302 UX |

*Primary Examiner*—George Harris
*Attorney*—Christen & Sabol

[57] ABSTRACT

A magnet for use in a magnetic gauge for measuring the thickness of a non-magnetic layer on a ferromagnetic base is made of magnetically anisotropic material.

9 Claims, 5 Drawing Figures

MAGNET FOR USE IN MAGNETIC THICKNESS GAUGES

The present invention relates to improvements in permanent magnets for use in thickness gauges of the type used, among other things, in the measuring of the thickness of a non-magnetic layer on a ferromagnetic base or in the measurement of a magnetic layer.

Thickness gauges of this type operate on the principle of measuring the attractive force exerted on a magnet and placed on the layer to be measured, this force being a function of the thickness of the layer. One such type of gauge is disclosed and claimed in U. S. Pat. No. 3,521,160, granted to the same applicant. The present invention is an improvement in the composition of the magnetic material disclosed in said prior patent.

A thickness gauge of this type comprises essentially an elongated permanent magnet secured to a rotary system which is supported at its center of gravity. The rotary system is contained within a housing in such a manner that the permanent magnet forms one end of the rotary system and arranged so that one of the poles of the permanent magnet can project from an opening in the housing so as to come in contact with the layer to be measured in response to the attraction exerted by either the ferromagnetic layer base which is coated with a non-magnetic layer or the ferromagnetic layer when it is a layer itself that is to be measured. The rotary system also includes a balanced arm which is connected with the movable measuring dial by means of a spring. Thus, when the dial is turned, an increasing force is exerted on the balanced arm in a direction to pull the magnet away from the ferromagnetic material and the dial itself may be calibrated so as to provide a direct reading of the thickness of the layer as a function of the effort required to separate the magnet from the surface being measured.

Only a relatively small attractive force in such magnets is required to provide accurate measurement of the usual layer thicknesses ranging between 0.001 and 20 mm. Further more, it is preferable that the attractive force of the magnet be at a minimum so as to avoid any chance for magnetic saturation of the ferromagnetic base material. Consequently, in the past it has been usual to employ isotropic permanent magnets for thickness gauges of this type, particularly those having the composition 12 Al, 2 F Ni, 3 Cu, 58 Fe (Alni 120, as defined by DIN 17410). There was no necessity in the past for using a composition having a greater magnetic force, such as anisotropic magnetic material, since the permanent magnets used had to be first demagnetized to a fraction of their full magnetization, for example to 10 to 20 percent of saturation to provide stabilization and a reduced attractive force.

It has been discovered, however, that the usual isotropic magnets previously used in the thickness gauges disclosed in the aforementioned U.S. Pat. No. 3,521,160, furnish inaccurate measurements under certain conditions. Such conditions are, for example, when measuring non-planar surfaces or when measuring along the edges of a flat plate or in the case of small objects where it is not possible to bring the elongated magnet into a position which is exactly perpendicular to the surface to be measured. Furthermore, inaccurate results can be due to merely the carelessness of the operator even when working with easily measurable flat surfaces. The reason for this is that if the magnet is not applied to the surface at right angles thereto there will be a change in the alignment of the magnetic flux inside the magnet which results in an inaccurate measurement when the magnet is incorrectly positioned. Not only is there an inaccurate result produced by improper positioning of the magnet but the change in the alignment of the flux is still present when the magnet is used for subsequent measurements so that these subsequent measurements will be affected by only a single incorrect positioning of the permanent magnet.

Accordingly, it is one of the objects of the present invention to eliminate the likelihood of derangement of the lines of flux within the permanent magnet resulting either from careless handling of the magnet or from its use with non-planar surfaces or irregularly shaped objects. Not only will a correct measurement be provided under these unusual circumstances but the use of the magnet under such conditions will not affect subsequent measurements, this object being capable of accomplishment by the use of permanent magnets composed of anisotropic material the magnetic saturation of which need not necessarily differ from that employed with the previous isotropic magnets.

The behavior of isotropic and anisotropic magnets is more specifically shown in the accompanying drawings, in which:

FIG. 1 illustrates a conventional isotropic magnet correctly positioned for measuring the thickness of a coating in accordance with the teachings of the before mentioned U.S. Pat. No. 3,521,160;

Figure 1:
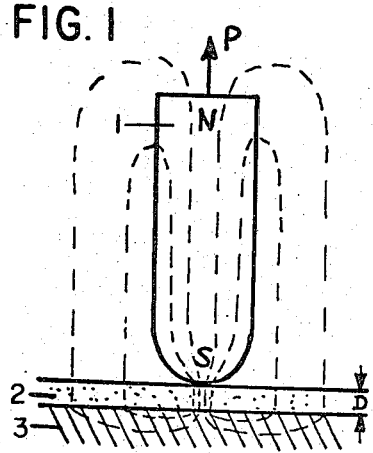

Referring now to FIG. 1, an isotropic permanent magnet of the usual type, indicated by numeral 1, having an elongated body with magnetic poles N and S is shown positioned with its elongated axis substantially perpendicular to a non-magnetic layer 2 applied to a ferromagnetic base, such as iron, indicated by 3. While the shape of the end of the magnet at the pole N is immaterial the pole S is preferably hemispherical in shape and it will be seen that the magnetic lines of force, indicated by the dotted lines, tend to flow in generally straight parallel lines concentrically disposed about the axis of the magnet substantially around its entire length but that they tend to become concentrated about the center of the area of contact between pole S and the layer 2. Therefore, in the position shown, the amount of force required to pull the magnet away from the ferromagnetic material 3 in the direction indicated by the arrow P represents a value indicative of the thickness, represented by the letter D, of the non-conducting layer 2.

Figure 2:
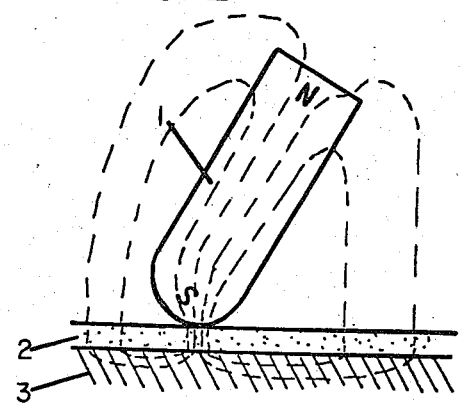
FIG. 2 illustrates the changes in the magnetic flux pattern produced in the magnet of FIG. 1 when the magnet is incorrectly positioned with respect to the surface to be measured.

FIG. 2 illustrates what happens when the magnet 1 is inproperly applied to a surface or when the surface is non-planar or so irregular that the magnet cannot be applied to the surface in a position such that the axis of the magnet is perpendicular to the surface.

As will be seen in FIG. 2, the axis of the magnet is tilted such that the contact of the hemispherical portion with the layer 2 occurs at a location offset from the central axis of the magnet. Consequently, due to the isotropic nature of the magnet the magnetic flux lines will concentrate to one side of the central axis, as shown by the dotted lines. Nevertheless, while the tilted position of the magnet in FIG. 2 will result in some inaccuracy in the measurement of the layer 2, the primary disadvantage of an isotropic magnet becomes evident when the magnet is subsequently applied correctly in a position perpendicular to the surface to be measured as will be seen in FIG. 3. In an isotropic magnet material the individual and magnet particles are not permanently aligned, with the result that the magnetic flux lines in such a magnet can easily be changed and whenever such a change takes place it causes temporary realignments of the individual magnetic particles and the particles tend to remain in that temporary realignment until acted upon by a new set of magnetic lines of force running in a different configuration.

Figure 3:
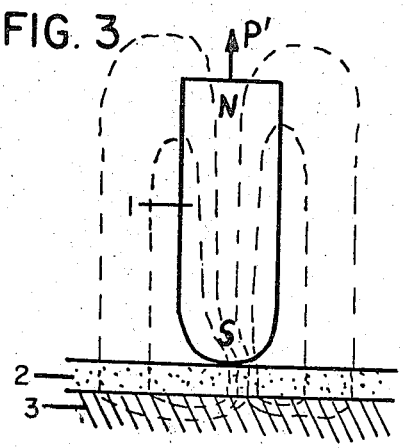
FIG. 3 illustrates the magnetic flux pattern of the magnet of FIG. 1, when properly positioned but subsequent to an improper positioning as in FIG. 2.

However, the magnetic particles in an isotropic magnet are not individually oriented to any particular direction, and therefore tend to maintain a particular orientation induced by the application of an external magnetic field until such time as another magnet field is applied. Therefore, if the magnet 1 is again brought into contact with a ferromagnetic surface 3, whose coating 2, is to be measured in the correct axially perpendicular position, as shown in FIG. 3, but subsequent to the measurement performed in FIG. 2 the magnetic particles in the magnet will not realign themselves fully and the magnetic lines of flux, as shown by the dotted lines, passing through the hemispherical pole portion S will not be evenly distributed about the central longitudinal axis as they were originally in FIG. 1. In other words, there will be a residual misalignment of the magnetic particles resulting from the incorrect positioning of the magnet during the previous measurement and this misalignment cannot be fully corrected unless the magnet is tilted in the opposite direction to compensate for the previous misalignment. Consequently, the amount of force P', indicated by the arrow in FIG. 3, will not be the same value as the force P in the example of FIG. 1 even though the coating 2 and the ferromagnetic base 3 in FIG. 3 is the same as the coating and base of FIG. 1.

To overcome the errors introduced into measurements performed with the use of the previously described permanent magnet compositions, it has been discovered that this can be accomplished by using permanent magnets composed of anisotropic magnet materials in which the magnetic particles are oriented in a preferred direction having a predetermined relationship to the body. Such a magnet is indicated by numeral 10 in FIGS. 4 and 5, in which the preferred direction of magnetic force is indicated by solid lines running generally parallel with respect to the elongated axis of the body 10. As in the previous forms, the ends of the body form pole pieces N and S, with at least one of the pole pieces intended to come in contact with the surface to be measured having a hemispherically formed surface, such as the pole S.

Figure 5:
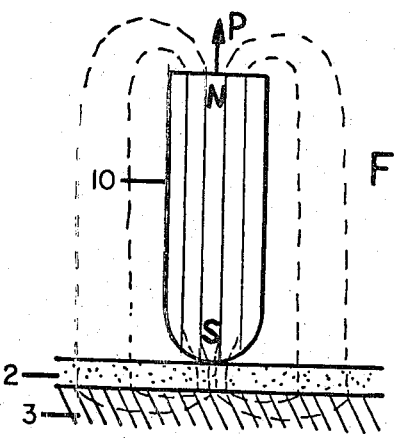
FIG. 5 shows the magnetic flux pattern of the magnet of FIG. 4, but when subsequently properly positioned.

As is to be expected, when the magnet 10 is properly oriented, at right angles to the surface to be measured as shown in FIG. 5, the magnetic flux lines indicated by dotted lines follow generally the same pattern as they do in the case of the isotropic magnet of FIG. 1, and the force required to move the magnet away from the surface, indicated by the arrow P, will be a function of the thickness D of surface 2 applied to the ferromagnetic base 3.

Figure 4:
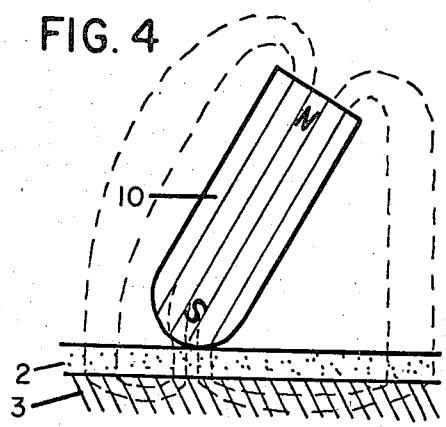
FIG. 4 illustrates the flux pattern of an anisotropic magnet manufactured in accordance with this invention but when improperly positioned.

Also, as can be seen in FIG. 4, if the magnet body 10 happens to be brought into contact with the surface 2 at some angle other than the perpendicular, the magnetic lines of flux will tend to be displaced at the pole end S toward one side of the central axis since they tend to concentrate in the direction of the ferromagnetic material of the base 3. This does not, however, disturb the orientation of the magnetic particles forming the magnetic body 10, because of its anisotropic quality.

As a result of this anisotropic quality, if the magnet 10 is subsequently applied to a surface in the correct relationship, as shown in FIG. 5, the flux lines will again concentrate around the central axis of the body and the force P exerted by the magnet will be identical with the force exerted before the incorrect positioning of the magnet of FIG. 4. In other words, contrary to the behavior of an isotropic magnet, there will not be any residual displacement of the orientation of the magnetic particles for which compensation must be made.

A particularly suitable anisotropic magnetic material consists, according to the invention, in the known compound of 8 Al, 15 Ni, 24 Co, 3 Cu, 50 Fe, eventually combined with further additives, such a compound being known for instance as Alnico 500, according to DIN 17410, whose magnetically preferred direction is obtained by cooling in a magnetic field. Other anisotropic magnetic materials are also suitable, such as the type $BaO \cdot 6Fe_2O_2$, wherein the Ba can be partially or totally substituted by Sr or Pb. Further anisotropic magnetic materials consisting of platin-cobalt-iron or of an alloy of cobalt with rare earths, particularly with cerium, samarium, praseodymium and/or "mixed metals," are also suitable.

Further changes may be made within the scope of the present invention whose principal features are intended to be covered by the appended claims.

The claims are:

1. A permanent magnet for use in magnetic thickness gauges of the type wherein the thickness of a surface to be measured is a function of the attractive force exerted in a preferred direction normal to said surface by said magnet when a predetermined portion of the body of said magnet is in contact with said surface and angularly oriented in a predetermined direction relative to said preferred direction, said permanent magnet body being composed of magnetically anisotropic material comprising magnetic particles individually oriented in the direction corresponding to said preferred direction when said magnet body is so oriented.

2. A permanent magnet as defined in claim 1, wherein said permanent magnet body when oriented in said predetermined direction is elongated in said preferred direction of magnetic force.

3. A permanent magnet as defined in claim 2, wherein at least a portion of one end of said elongated permanent magnet body is provided with a hemispherically shaped surface concentric to said preferred direction for said contact with a surface to be measured.

4. A permanent magnet as defined in claim 1, wherein said magnetically anisotropic material basically consists of an aluminum-nickel-cobalt-iron-alloy.

5. A permanent magnet as defined in claim 1, wherein said magnetically anisotropic material basically consists of $BaO.6Fe_2O_3$.

6. A permanent magnet as defined in claim 6, wherein the Ba is at least partially substituted by Sr.

7. A permanent magnet as defined in claim 6, wherein the Ba is at least partially substituted by Pb.

8. A permanent magnet as defined in claim 1, wherein said magnetically anisotropic material basically consists of Pt-Co-Fe.

9. A permanent magnet as defined in claim 1, wherein said magnetically anisotropic material basically consists of an alloy of Co with rare earths.

* * * * *

UNITED STATES PATENT OFFICE
CERTIFICATE OF CORRECTION

Patent No. 3,699,487     Dated October 17, 1972

Inventor(s) Erich Steingroever

It is certified that error appears in the above-identified patent and that said Letters Patent are hereby corrected as shown below:

Correct item [73] to read, --Assignee: Elektro-Physik Hans Nix & Dr. Ing. E. Steingroever, KG.--;

Claims 6 and 7, line 1, in each instance, change "claim 6" to --claim 5--.

Signed and sealed this 15th day of May 1973.

(SEAL)
Attest:

EDWARD M. FLETCHER, JR.
Attesting Officer

ROBERT GOTTSCHALK
Commissioner of Patents